(12) United States Patent
Jiang et al.

(10) Patent No.: US 12,307,899 B2
(45) Date of Patent: May 20, 2025

(54) LIGHT PROJECTION APPARATUS AND METHOD, AND STORAGE MEDIUM

(71) Applicant: SHENZHEN YINWANG INTELLIGENT TECHNOLOGIES CO., LTD, Shenzhen (CN)

(72) Inventors: Haiying Jiang, Tokyo (JP); Yuan Xia, Beijing (CN); Nan Liu, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 18/468,295

(22) Filed: Sep. 15, 2023

(65) Prior Publication Data
US 2024/0005795 A1   Jan. 4, 2024

Related U.S. Application Data

(63) Continuation of application No. PCT/CN2022/079737, filed on Mar. 8, 2022.

(30) Foreign Application Priority Data

Mar. 18, 2021   (CN) .......................... 202110291233.1

(51) Int. Cl.
*G08G 1/16* (2006.01)
*B60Q 1/50* (2006.01)

(52) U.S. Cl.
CPC ............. *G08G 1/164* (2013.01); *B60Q 1/525* (2013.01); *B60Q 2400/50* (2013.01)

(58) Field of Classification Search
None
See application file for complete search history.

(56) References Cited

U.S. PATENT DOCUMENTS

| 9,679,482 | B2 | 6/2017 | Werner et al. | |
| 9,903,733 | B2* | 2/2018 | Bai | G08G 1/0112 |
| 10,134,280 | B1* | 11/2018 | You | B60Q 1/525 |

(Continued)

FOREIGN PATENT DOCUMENTS

| CN | 110758234 A | 2/2020 |
| CN | 111251977 A | 6/2020 |

(Continued)

*Primary Examiner* — Muhammad Adnan
(74) *Attorney, Agent, or Firm* — Conley Rose, P.C.

(57) ABSTRACT

A light projection apparatus includes an information obtaining module, a processing module, and a projection module. The information obtaining module is configured to obtain environment information and status information of a first object. The processing module is configured to determine, based on the status information, that the first object is a potentially dangerous object; determine a potentially dangerous area of the first object; determine a to-be-projected area based on the potentially dangerous area and the environment information, where the to-be-projected area is an area in which there is no light projection and light projection is allowed; and determine whether the to-be-projected area is within a projection range of the projection module. In response to a first result determined by the processing module, the projection module performs light projection in the to-be-projected area, to prompt a potential danger caused by the first object.

17 Claims, 6 Drawing Sheets

(56) References Cited

U.S. PATENT DOCUMENTS

| | | | |
|---|---|---|---|
| 10,134,283 B2 | 11/2018 | Masuda et al. | |
| 10,479,269 B2 | 11/2019 | Kim et al. | |
| 2006/0087416 A1* | 4/2006 | Kumabe | B60Q 1/50 340/435 |
| 2006/0097858 A1* | 5/2006 | Kumabe | B60Q 1/50 348/148 |
| 2009/0322562 A1* | 12/2009 | Sachse | G08G 1/096716 340/907 |
| 2013/0249395 A1* | 9/2013 | Hatakeyama | B60K 35/80 315/77 |
| 2013/0335212 A1* | 12/2013 | Purks | B60Q 1/34 340/465 |
| 2017/0253177 A1* | 9/2017 | Kawamata | B60Q 1/249 |
| 2019/0034760 A1* | 1/2019 | Narayanaswamy Chandrasekaran | G06F 11/0709 |
| 2019/0077332 A9* | 3/2019 | Rötzer | G06V 20/58 |
| 2019/0103017 A1* | 4/2019 | Ohta | B60Q 1/04 |
| 2019/0287394 A1* | 9/2019 | Aoude | G08G 1/096716 |
| 2019/0322210 A1* | 10/2019 | Han | B60Q 1/0023 |
| 2019/0381937 A1* | 12/2019 | Rakshit | G06T 19/006 |
| 2020/0074847 A1* | 3/2020 | Wang | B60Q 1/547 |
| 2020/0242922 A1* | 7/2020 | Dulberg | G08G 1/166 |
| 2020/0398743 A1* | 12/2020 | Huber | B60W 30/0956 |
| 2021/0065551 A1* | 3/2021 | Manohar | G08G 1/0129 |

FOREIGN PATENT DOCUMENTS

| | | |
|---|---|---|
| CN | 111439195 A | 7/2020 |
| CN | 110341582 B | 10/2020 |
| JP | 2010277123 A | 12/2010 |
| JP | 2011218826 A | 11/2011 |
| JP | 2015185075 A | 10/2015 |
| JP | 2017039478 A | 2/2017 |
| JP | 2017159699 A | 9/2017 |
| JP | 2021009486 A | 1/2021 |

* cited by examiner

LIGHT PROJECTION APPARATUS AND METHOD, AND STORAGE MEDIUM

CROSS-REFERENCE TO RELATED APPLICATIONS

This is a continuation of International Patent Application No. PCT/CN2022/079737 filed on Mar. 8, 2022, which claims priority to Chinese Patent Application No. 202110291233.1 filed on Mar. 18, 2021. The disclosures of the aforementioned applications are hereby incorporated by reference in their entireties.

TECHNICAL FIELD

This disclosure relates to the field of intelligent transportation technologies, and in particular, to a light projection apparatus and method, and a storage medium.

BACKGROUND

In a driving process, a vehicle may encounter a dangerous scenario in which a pedestrian suddenly appears on a driving lane (that is, an obscured pedestrian-vehicle crash), or may encounter a traffic condition on a complex road surface (for example, a snowy road surface). If a traffic participant does not detect potential dangers in time, a traffic accident may occur, affecting traffic safety.

SUMMARY

In view of this, a light projection apparatus and method, and a storage medium are provided.

According to a first aspect, an embodiment of this disclosure provides a light projection apparatus. The apparatus includes an information obtaining module, a processing module, and a projection module. The processing module is separately connected to the information obtaining module and the projection module. The information obtaining module is configured to obtain environment information and status information of a first object, where the first object includes at least one of a vehicle or a pedestrian, and the status information of the first object includes at least one of location information or motion information of the first object. The processing module is configured to determine, based on the status information, that the first object is a potentially dangerous object, determine a potentially dangerous area of the first object, determine a to-be-projected area based on the potentially dangerous area and the environment information, where the to-be-projected area is an area in which there is no light projection and light projection is allowed, and determine whether the to-be-projected area is within a projection range of the projection module. The projection module is configured to perform, in response to a first result determined by the processing module, light projection in the to-be-projected area, to prompt a potential danger caused by the first object, where the first result is that the to-be-projected area is within the projection range of the projection module.

The information obtaining module is not limited to a sensor, and may be a module having an information receiving function, for example, at least one of a vehicle-to-everything (V2X) module, a cellular communication module, or a BLUETOOTH communication module.

According to this embodiment of this disclosure, the light projection apparatus includes the information obtaining module, the processing module, and the projection module. The information obtaining module obtains the environment information and the status information of the first object. The processing module may determine, based on the status information, that the first object is the potentially dangerous object, determine the potentially dangerous area of the first object, determine, based on the potentially dangerous area and the environment information, the to-be-projected area in which there is no light projection and light projection is allowed, and determine whether the to-be-projected area is within the projection range of the projection module. In response to the first result of the processing module (the to-be-projected area is within the projection range of the projection module), the projection module performs light projection in the to-be-projected area, to prompt the potential danger caused by the first object. In this way, the light projection apparatus can use a sensing and projection function of the light projection apparatus, when sensing that another traffic participant has a potential danger, prompt or warn the potential danger, and during projection, determine an area in which there is no light projection and light projection is allowed as the to-be-projected area, to avoid overlapping projection, improve a warning effect, and form a danger information sharing mechanism, thereby effectively improving traffic safety.

According to the first aspect, in a first possible implementation of the light projection apparatus, the apparatus further includes a sending module configured to send, in response to a second result determined by the processing module, information indicating that the first object is the potentially dangerous object and the to-be-projected area to another apparatus, where the second result is that the to-be-projected area is not within the projection range of the projection module.

The other apparatus may be, for example, another light projection apparatus whose projection range can cover the to-be-projected area, or may be a forwarding apparatus (such as a road side unit (RSU)) that does not have a projection function, or may be another light projection apparatus whose projection range cannot cover the to-be-projected area, so as to implement relay forwarding of projection information.

In this embodiment, when the to-be-projected area is not within the projection range of the projection module, the light projection apparatus can send, by using the sending module, the information indicating that the first object is the potentially dangerous object and the to-be-projected area to another apparatus, so that the other apparatus that has a projection function performs light projection on the potential danger caused by the first object, or the other apparatus that does not have a projection function forwards the information indicating that the first object is the potentially dangerous object and the to-be-projected area. In this way, the other apparatus can perform light projection or relay forwarding on a potential danger that is in the to-be-projected area but is not within the projection range of the light projection apparatus, so that projection efficiency can be improved, and danger information can be shared, thereby improving traffic safety.

According to the first aspect or the first possible implementation of the first aspect, in a second possible implementation of the light projection apparatus, the first object is a plurality of objects. The processing module is further configured to determine a projection sequence of the plurality of objects based on a potential danger degree of each of the plurality of objects. That the projection module is configured to perform light projection in the to-be-projected area includes the following. The projection module is configured to perform, according to the projection sequence, a plurality of pieces of light projection that are in a one-to-one correspondence with the plurality of objects.

In this embodiment, by determining the projection sequence of the plurality of objects, an object with a high potential danger degree can be preferentially projected, thereby improving a warning effect, effectively reducing an occurrence rate of a potential danger, and improving traffic safety.

According to the first aspect, or any one of the first possible implementation of the first aspect or the second possible implementation of the first aspect, in a third possible implementation of the light projection apparatus, the processing module is further configured to generate a projection image and light control information. That the projection module is configured to perform light projection in the to-be-projected area includes the following. The projection module is configured to perform light projection in the to-be-projected area based on the projection image and the light control information, where the projection image is determined based on the environment information and the potential danger caused by the first object, the light control information is determined based on the environment information, the projection image, and the to-be-projected area, and the light control information includes at least one of an angle, brightness, or a color of a light.

In this embodiment, the projection image is determined based on the environment information and the potential danger caused by the first object, and the light control information is determined based on the environment information, the projection image, and an image area, so that the projection image and the light control information can be combined with the potential danger caused by the first object and the external environment information, thereby improving readability of danger warning, and improving a projection effect.

According to the first aspect or any one of the first possible implementation of the first aspect to the third possible implementation of the first aspect, in a fourth possible implementation of the light projection apparatus, the processing module is further configured to determine a potentially dangerous scenario of the first object.

In this embodiment, the processing module can further determine the potentially dangerous scenario of the first object. By determining the potentially dangerous scenario of the first object, it is convenient to identify a potential danger degree of the first object and determine a projection image, thereby improving accuracy of light projection.

According to the fourth possible implementation of the first aspect, in a fifth possible implementation of the light projection apparatus, the processing module is further configured to determine a potential danger degree of the first object based on at least one of the potentially dangerous area or the potentially dangerous scenario.

In this embodiment, the potential danger degree of the first object is determined based on at least one of the potentially dangerous area or the potentially dangerous scenario, so that the potential danger degree can be associated with the potentially dangerous area or the potentially dangerous scenario, thereby improving accuracy of the potential danger degree of the first object.

According to the first aspect, in a sixth possible implementation of the light projection apparatus, that the processing module is configured to determine, based on the status information, that the first object is a potentially dangerous object includes predicting, based on the status information, a motion track of the first object in preset future duration, and determining, based on the motion track, that the first object is the potentially dangerous object.

In this embodiment, the motion track of the first object in the preset future duration can be predicted based on the status information, and the first object is determined as the potentially dangerous object based on the motion track, so that the potentially dangerous object can be determined by using the motion track. This improves processing efficiency of the processing module and accuracy of the potentially dangerous object.

According to a sixth possible implementation of the first aspect, in a seventh possible implementation of the light projection apparatus, the preset future duration includes a plurality of future moments, the motion track of the first object in the preset future duration includes location areas of the first object at the plurality of future moments, and determining, based on the motion track, that the first object is the potentially dangerous object includes, for an object that is a vehicle in the first object, determining, at any future moment in the preset future duration, whether a location area of the object at the future moment overlaps a location area of another object other than the object in the first object at the future moment, and when the location areas overlap, determining that the object and the other object whose location area overlaps the location area of the object are potentially dangerous objects.

In this embodiment, the first object is determined as the potentially dangerous object based on overlapping of location areas at a same future moment, which is simple, fast, and highly accurate, and can improve processing efficiency of the processing module.

According to the first aspect or any one of the first possible implementation of the first aspect to the seventh possible implementation of the first aspect, in an eighth possible implementation of the light projection apparatus, the light projection apparatus is applied to a vehicle or road side infrastructure.

In this embodiment, the light projection apparatus can be applied to a vehicle or road side infrastructure. The vehicle or the road side infrastructure may detect, by using a sensing function of the vehicle or the road side infrastructure, a potential danger caused by another traffic participant in time, and prompt the potential danger through light projection, to improve traffic safety.

According to a second aspect, an embodiment of this disclosure provides a light projection method. The method is applied to a light projection apparatus, and the method includes obtaining environment information and status information of a first object, where the first object includes at least one of a vehicle or a pedestrian, and the status information of the first object includes at least one of location information or motion information of the first object, determining, based on the status information, that the first object is a potentially dangerous object, determining a potentially dangerous area of the first object, determining a to-be-projected area based on the potentially dangerous area and the environment information, where the to-be-projected area is an area in which there is no light projection and light projection is allowed, determining whether the to-be-projected area is within a projection range of the light projection apparatus, and when the to-be-projected area is within the projection range of the light projection apparatus, performing light projection in the to-be-projected area, to prompt a potential danger caused by the first object.

According to this embodiment of this disclosure, the light projection method is applied to the light projection apparatus. In the method, the environment information and the status information of the first object can be obtained, that the first object is the potentially dangerous object is determined based on the status information, and the potentially dangerous area of the first object is further determined. Then, the to-be-projected area is determined based on the potentially dangerous area and the environment information, where the to-be-projected area is an area in which there is no light projection and light projection is allowed. In addition, whether the to-be-projected area is within the projection range of the projection module is determined. When the to-be-projected area is within the projection range of the light projection apparatus, light projection is performed in the to-be-projected area, to prompt the potential danger caused by the first object, so that when it is sensed that another traffic participant has a potential danger, the potential danger can be prompted or warned through light projection, and during projection, an area in which there is no light projection and light projection is allowed is determined as the to-be-projected area, to avoid overlapping projection, improve a warning effect, and form a danger information sharing mechanism, thereby effectively improving traffic safety.

According to the second aspect, in a first possible implementation of the light projection method, the method further includes, when the to-be-projected area is not within the projection range of the light projection apparatus, sending information indicating that the first object is the potentially dangerous object and the to-be-projected area to another apparatus.

In this embodiment, when the to-be-projected area is not within the projection range of the projection apparatus, the information indicating that the first object is the potentially dangerous object and the to-be-projected area can be sent to another apparatus, so that the other apparatus that has a projection function performs light projection on the potential danger caused by the first object, or the other apparatus that does not have a projection function forwards the information indicating that the first object is the potentially dangerous object and the to-be-projected area. In this way, the other apparatus can perform light projection or relay forwarding on a potential danger that is in the to-be-projected area but is not within the projection range of the light projection apparatus, so that projection efficiency can be improved, and danger information can be shared, thereby improving traffic safety.

According to the second aspect or the first possible implementation of the second aspect, in a second possible implementation of the light projection method, the first object is a plurality of objects, the method further includes determining a projection sequence of the plurality of objects based on a potential danger degree of each of the plurality of objects, and performing light projection in the to-be-projected area includes performing, according to the projection sequence, a plurality of pieces of light projection that are in a one-to-one correspondence with the plurality of objects.

In this embodiment, by determining the projection sequence of the plurality of objects, an object with a high potential danger degree can be preferentially projected, thereby improving a warning effect, effectively reducing an occurrence rate of a potential danger, and improving traffic safety.

According to the second aspect, or any one of the first possible implementation of the second aspect or the second possible implementation of the second aspect, in a third possible implementation of the light projection method, the method further includes generating a projection image and light control information, and performing light projection in the to-be-projected area includes performing, based on the projection image and the light control information, light projection in the to-be-projected area, where the projection image is determined based on the environment information and the potential danger caused by the first object, the light control information is determined based on the environment information, the projection image, and the to-be-projected area, and the light control information includes at least one of an angle, brightness, or a color of a light.

In this embodiment, the projection image is determined based on the environment information and the potential danger caused by the first object, and the light control information is determined based on the environment information, the projection image, and an image area, so that the projection image and the light control information can be combined with the potential danger caused by the first object and the external environment information, thereby improving readability of danger warning, and improving a projection effect.

According to the second aspect or any one of the first possible implementation of the second aspect to the third possible implementation of the second aspect, in a fourth possible implementation of the light projection method, the method further includes determining a potentially dangerous scenario of the first object.

In this embodiment, the potentially dangerous scenario of the first object can be determined. In this way, it is convenient to identify a potential danger degree of the first object and determine a projection image, thereby improving accuracy of light projection.

According to the fourth possible implementation of the second aspect, in a fifth possible implementation of the light projection method, the method further includes determining a potential danger degree of the first object based on at least one of the potentially dangerous area or the potentially dangerous scenario.

In this embodiment, the potential danger degree of the first object is determined based on at least one of the potentially dangerous area or the potentially dangerous scenario, so that the potential danger degree can be associated with the potentially dangerous area or the potentially dangerous scenario, thereby improving accuracy of the potential danger degree of the first object.

According to the second aspect, in a sixth possible implementation of the light projection method, determining, based on the status information, that the first object is a potentially dangerous object includes predicting, based on the status information, a motion track of the first object in preset future duration, and determining, based on the motion track, that the first object is the potentially dangerous object.

In this embodiment, the motion track of the first object in the preset future duration can be predicted based on the status information, and the first object is determined as the potentially dangerous object based on the motion track, so that the potentially dangerous object can be determined by using the motion track. This improves processing efficiency and accuracy of the potentially dangerous object.

According to a sixth possible implementation of the second aspect, in a seventh possible implementation of the light projection method, the preset future duration includes a plurality of future moments, the motion track of the first object in the preset future duration includes location areas of the first object at the plurality of future moments, and determining, based on the motion track, that the first object is the potentially dangerous object includes, for an object that is a vehicle in the first object, determining, at any future moment in the preset future duration, whether a location area of the object at the future moment overlaps a location area of another object other than the object in the first object at the future moment, and when the location areas overlap, determining that the object and the other object whose location area overlaps the location area of the object are potentially dangerous objects.

In this embodiment, the first object is determined as the potentially dangerous object based on overlapping of location areas at a same future moment, which is simple, fast, and highly accurate, and can improve processing efficiency.

According to the second aspect or any one of the first possible implementation of the second aspect to the seventh possible implementation of the second aspect, in an eighth possible implementation of the light projection method, the light projection apparatus is applied to a vehicle or road side infrastructure.

In this embodiment, the light projection apparatus is applied to a vehicle or road side infrastructure. The vehicle or the road side infrastructure may detect, by using a sensing function of the vehicle or the road side infrastructure, a potential danger caused by another traffic participant in time, and prompt the potential danger through light projection, to improve traffic safety.

According to a third aspect, an embodiment of this disclosure provides a light projection apparatus, including a processor and a memory configured to store instructions that can be executed by the processor. When executing the instructions, the processor is configured to implement the light projection method in the second aspect or one or more of the possible implementations of the second aspect.

According to this embodiment of this disclosure, the environment information and the status information of the first object can be obtained, that the first object is the potentially dangerous object is determined based on the status information, and the potentially dangerous area of the first object is further determined. Then, the to-be-projected area is determined based on the potentially dangerous area and the environment information, where the to-be-projected area is an area in which there is no light projection and light projection is allowed. In addition, whether the to-be-projected area is within the projection range of the projection module is determined. When the to-be-projected area is within the projection range of the light projection apparatus, light projection is performed in the to-be-projected area, to prompt the potential danger caused by the first object, so that when it is sensed that another traffic participant has a potential danger, the potential danger can be prompted or warned through light projection, and during projection, an area in which there is no light projection and light projection is allowed is determined as the to-be-projected area, to avoid overlapping projection, improve a warning effect, and form a danger information sharing mechanism, thereby effectively improving traffic safety.

According to a fourth aspect, an embodiment of this disclosure provides a computer-readable storage medium. The computer-readable storage medium stores computer program instructions. When the computer program instructions are executed by a processor, the light projection method according to the second aspect or one or more of the possible implementations of the second aspect is implemented.

According to embodiments of this disclosure, the environment information and the status information of the first object can be obtained, that the first object is the potentially dangerous object is determined based on the status information, and the potentially dangerous area of the first object is further determined. Then, the to-be-projected area is determined based on the potentially dangerous area and the environment information, where the to-be-projected area is an area in which there is no light projection and light projection is allowed. In addition, whether the to-be-projected area is within the projection range of the projection module is determined. When the to-be-projected area is within the projection range of the light projection apparatus, light projection is performed in the to-be-projected area, to prompt the potential danger caused by the first object, so that when it is sensed that another traffic participant has a potential danger, the potential danger can be prompted or warned through light projection, and during projection, an area in which there is no light projection and light projection is allowed is determined as the to-be-projected area, to avoid overlapping projection, improve a warning effect, and form a danger information sharing mechanism, thereby effectively improving traffic safety.

According to a fifth aspect, an embodiment of this disclosure provides a computer program product, including computer-readable code or a non-volatile computer-readable storage medium carrying computer-readable code. When the computer-readable code runs in an electronic device, a processor in the electronic device performs the light projection method in the second aspect or one or more of the possible implementations of the second aspect.

According to this embodiment of this disclosure, the environment information and the status information of the first object can be obtained, that the first object is the potentially dangerous object is determined based on the status information, and the potentially dangerous area of the first object is further determined. Then, the to-be-projected area is determined based on the potentially dangerous area and the environment information, where the to-be-projected area is an area in which there is no light projection and light projection is allowed. In addition, whether the to-be-projected area is within the projection range of the projection module is determined. When the to-be-projected area is within the projection range of the light projection apparatus, light projection is performed in the to-be-projected area, to prompt the potential danger caused by the first object, so that when it is sensed that another traffic participant has a potential danger, the potential danger can be prompted or warned through light projection, and during projection, an area in which there is no light projection and light projection is allowed is determined as the to-be-projected area, to avoid overlapping projection, improve a warning effect, and form a danger information sharing mechanism, thereby effectively improving traffic safety.

These aspects and other aspects of this disclosure are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this disclosure, and are intended to explain principles of this disclosure.

DESCRIPTION OF EMBODIMENTS

Figure 1A:
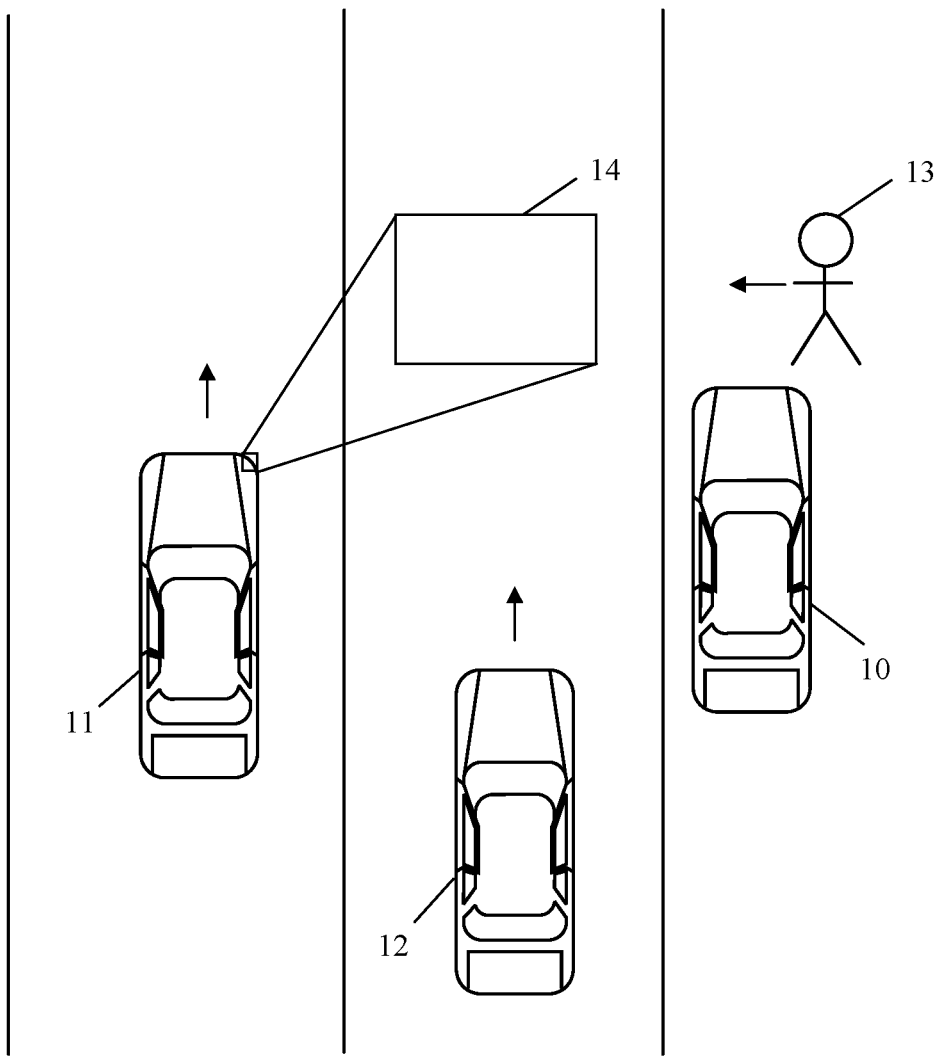
FIG. 1A is a schematic diagram of an application scenario of a light projection apparatus according to an embodiment of this disclosure.

The following describes various example embodiments, features, and aspects of this disclosure in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment or illustration". Any embodiment described as an "example" is not necessarily explained as being superior or better than other embodiments.

In addition, to better describe this disclosure, numerous specific details are given in the following specific implementations. A person skilled in the art should understand that this disclosure can also be implemented without some specific details. In some embodiments, methods, means, elements, and circuits that are well-known to a person skilled in the art are not described in detail, so that the subject matter of this disclosure is highlighted.

For a danger that may be encountered in a driving process, a vehicle usually uses a V2X wireless communication technology to exchange information with a surrounding vehicle, infrastructure, or a pedestrian, to sense a traffic condition of a surrounding road, so as to improve traffic safety.

However, when the V2X technology is used for communication, all traffic participants need to be equipped with a V2X terminal apparatus. However, a large quantity of terminal devices used by conventional vehicles, infrastructure, or pedestrians are not equipped with a V2X terminal apparatus, and do not have a V2X function. In addition, even if a terminal device used by a pedestrian has a V2X function, the pedestrian may ignore a danger alarm from the terminal device.

In some scenarios, the vehicle may further project an identifier or warning information on a road surface by using an in-vehicle light road projection apparatus, to assist driving, or perform a vehicle-related reminder on a pedestrian or the like. For example, when the vehicle is reversed or a door is opened, the vehicle may project, on the road surface by using the in-vehicle light road projection apparatus, reminder information about the vehicle reversal or the door opening.

However, the existing in-vehicle lighting road surface projection apparatus is mainly configured to improve driving experience of the vehicle and driving safety of the vehicle, and does not warn a danger that may be encountered by a traffic participant such as a surrounding vehicle or a pedestrian. In addition, when each vehicle performs road surface projection by itself, a plurality of images overlap on the road surface, which may cause misunderstanding to surrounding traffic users, thereby affecting traffic safety.

To resolve the foregoing technical problem, this disclosure provides a light projection apparatus. The light projection apparatus in this embodiment of this disclosure can sense a traffic condition of a surrounding road, determine a to-be-projected area (an area in which there is no light projection and light projection is allowed) when a potential danger related to another traffic participant (for example, a surrounding vehicle, a pedestrian, or a non-motor vehicle) is found, and indicate, by using light projection, a potential danger caused by the other traffic participant when the to-be-projected area is within a projection range of the light projection apparatus. In this way, when sensing that the other traffic participant has a potential danger, the light projection apparatus can prompt or warn the potential danger through light projection, and during projection, determine an area in which there is no light projection and light projection is allowed as the to-be-projected area, so as to avoid overlapping projection, reduce overlapping of a plurality of images on a road surface, and improve projection and warning effects, thereby forming a danger information sharing mechanism and effectively improving traffic safety.

The light projection apparatus in this embodiment of this disclosure may be applied to a vehicle. The vehicle may detect, by using a sensing function of the vehicle, a potential danger caused by another traffic participant in time, and prompt the potential danger through light projection. The vehicle may include a moving vehicle and a vehicle in a static state. A motion status of the vehicle is not limited in this disclosure.

FIG. 1A is a schematic diagram of an application scenario of a light projection apparatus according to an embodiment of this disclosure. As shown in FIG. 1A, a vehicle 10 is a powered-off vehicle (cannot be sensed) parked on a road side, a vehicle 11 and a vehicle 12 are moving vehicles, the vehicle 11 is equipped with a light projection apparatus and has a sensing function, and the vehicle 12 does not have a sensing function. The vehicle 11 senses, during driving, that a pedestrian 13 is moving towards a direction of a motor vehicle lane, that is, senses an obscured pedestrian-vehicle crash scenario, and further senses that the vehicle 12 is approaching a location at which the pedestrian 13 is to appear. However, because the vehicle 12 is blocked by the vehicle 10, a driver of the vehicle 12 cannot detect the pedestrian 13 in time. The vehicle 12 is a potentially dangerous object. In this case, the vehicle 11 may determine a to-be-projected area 14 (for example, an area at which the pedestrian 13 is to appear) for the vehicle 12. The to-be-projected area 14 is an area in which there is no light projection and light projection is allowed. The vehicle 11 further determines whether the to-be-projected area 14 is within a projection range of the light projection apparatus. If the to-be-projected area 14 is within the projection range of the light projection apparatus, the vehicle 11 performs light projection in the to-be-projected area 14 by using a right headlight, and displays warning information or warning signs such as "A pedestrian exists in front" and "Pay attention to a pedestrian" on a road surface, to remind the vehicle 12.

Figure 1B:
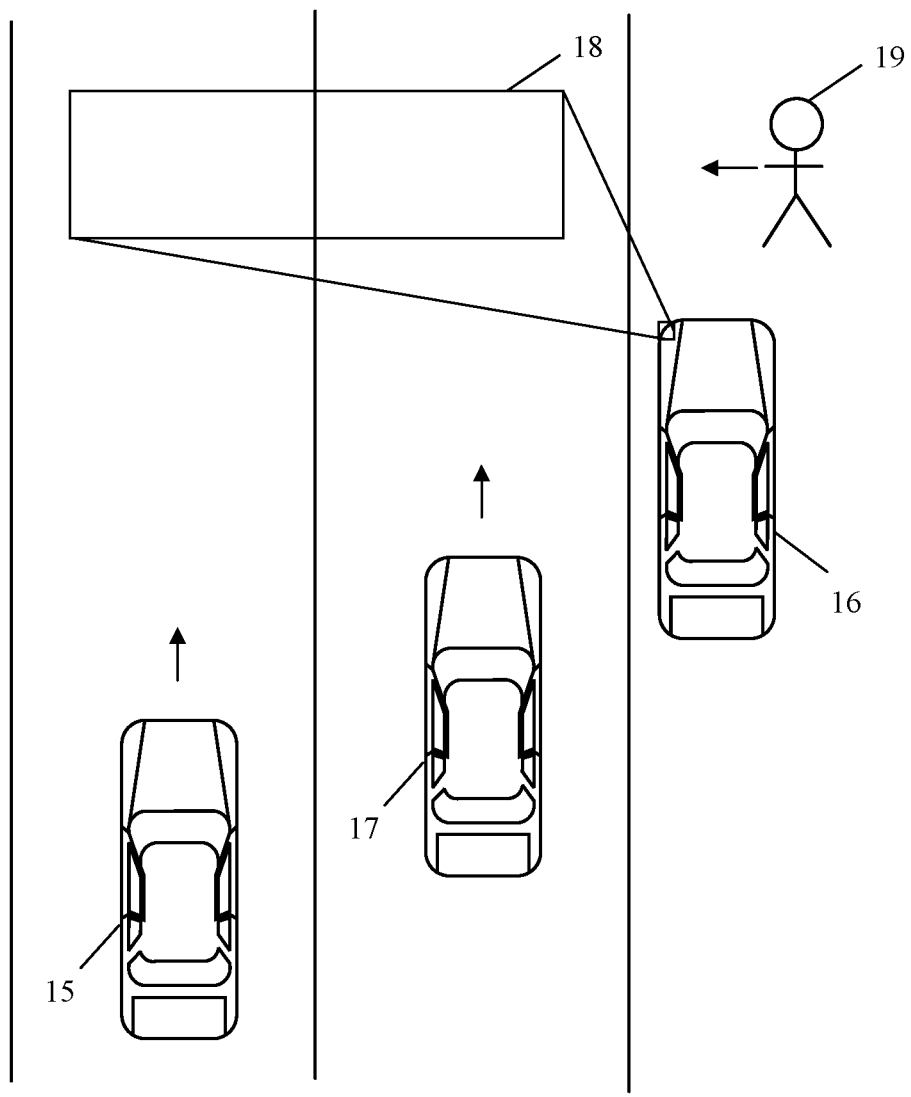
FIG. 1B is a schematic diagram of an application scenario of a light projection apparatus according to an embodiment of this disclosure.

FIG. 1B is a schematic diagram of an application scenario of a light projection apparatus according to an embodiment of this disclosure. As shown in FIG. 1B, both a vehicle 15 and a vehicle 17 are driving vehicles, and neither of them has a sensing function. A vehicle 16 is a vehicle that is parked on a road side but is not powered off (for example, a vehicle that is waiting for a red light to turn green, a bus waiting for passengers to take on and off on a road side, or a vehicle that is temporarily parked on a road side). The vehicle 16 is equipped with a light projection apparatus and has a sensing function. Although the vehicle 16 is in a static state, the vehicle 16 is not powered off, and is still performing sensing. When the vehicle 16 senses that a pedestrian 19 in front of the vehicle wants to cross the road, to improve traffic safety, the vehicle 16 may determine a to-be-projected area 18 (for example, an area in front of the pedestrian) for the pedestrian 19. The to-be-projected area 18 is an area in which there is no light projection and light projection is allowed. The vehicle 16 further determines whether the to-be-projected area 18 is within a projection range of the light projection apparatus of the vehicle 16. If the to-be-projected area 18 is within the projection range of the light projection apparatus of the vehicle 16, the vehicle 16 performs light projection in the to-be-projected area 18 by using a left headlight, and display prompt information or a prompt identifier such as "A pedestrian crosses the road", to remind a common vehicle that does not have a sensing function behind, for example, the vehicle 15 and the vehicle 17.

The light projection apparatus in this embodiment of this disclosure may be further applied to road side infrastructure such as an RSU. For example, the light projection apparatus applied to the RSU may sense a traffic condition of a surrounding road, and determine a to-be-projected area when sensing a dangerous scenario such as an obscured pedestrian-vehicle crash scenario or a scenario in which a traffic accident occurs in front, where the to-be-projected area is an area in which there is no light projection and light projection is allowed, and determine whether the to-be-projected area is within a projection range of the RSU. If the to-be-projected area is within the projection range of the RSU, the light projection apparatus performs light projection, and projects warning information or a warning identifier into the to-be-projected area, to remind a traffic participant that does not have a sensing function (for example, does not have a V2X function) and a pedestrian that has a sensing function but often ignores warning information.

Figure 2:
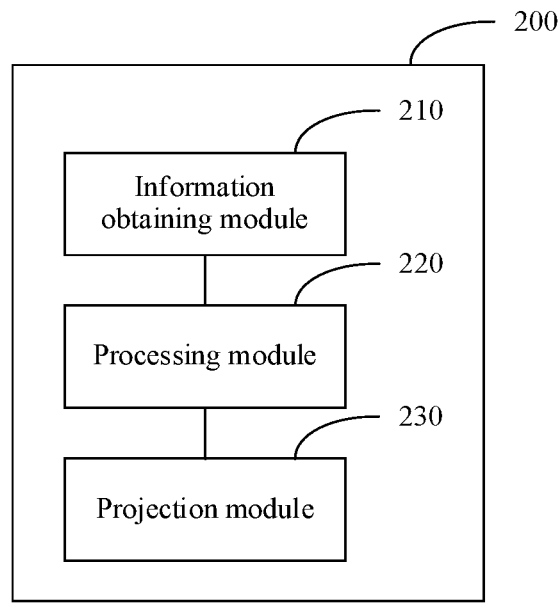
FIG. 2 is a schematic diagram of a structure of a light projection apparatus according to an embodiment of this disclosure.

FIG. 2 is a schematic diagram of a structure of a light projection apparatus 200 according to an embodiment of this disclosure. As shown in FIG. 2, the light projection apparatus 200 includes an information obtaining module 210, a processing module 220, and a projection module 230. The processing module 220 is separately connected to the information obtaining module 210 and the projection module 230.

The information obtaining module 210 may be a sensor. The sensor includes but is not limited to at least one of a camera, a laser imaging, detection, and ranging (LiDAR), a V2X communication unit, a map unit, an inertial measurement unit (IMU), a Global Positioning System (GPS), a global navigation satellite system (GNSS), and the like.

The information obtaining module 210 may further be a module having an information receiving function, for example, a V2X communication module, a cellular communication module, or a BLUETOOTH communication module. A specific implementation of the information obtaining module is not limited in this disclosure.

The information obtaining module 210 may be configured to obtain environment information and status information of a first object. That is, the first object is a traffic participant in a sensing area of the light projection apparatus 200. The first object may include at least one of a vehicle or a pedestrian. For example, when a vehicle A equipped with the light projection apparatus 200 travels on a high-speed road, all traffic participants in a sensing area of the vehicle A are vehicles, and in this case, the first object is a vehicle. When the vehicle A equipped with the light projection apparatus 200 travels on a country road, there is no vehicle around the vehicle A, and only a pedestrian passes by, all traffic participants in the sensing area of the vehicle A are pedestrians, and in this case, the first object is a pedestrian. When the vehicle A equipped with the light projection apparatus 200 travels on a city road, and there are both a vehicle and a pedestrian around the vehicle A, traffic participants in the sensing area of the vehicle A include the vehicle and the pedestrian, and in this case, the first object is a vehicle and a pedestrian.

In a possible implementation, the information obtaining module 210 may identify the first object from obtained data through information matching. For example, the information obtaining module 210 matches the obtained data with preset vehicle information, to obtain the first object as a vehicle, and matches the obtained data with preset pedestrian information, to identify the first object as a pedestrian.

In a possible implementation, the status information of the first object may include at least one of location information or motion information of the first object. That is, the status information of the first object includes the location information of the first object, or the status information of the first object includes the motion information of the first object, or the status information of the first object includes the location information and the status information of the first object. The motion information may be, for example, a moving speed, an acceleration, or a motion status of the first object. The status information of the first object may further include other information related to a status of the first object. A person skilled in the art may set specific content of the status information based on an actual situation. This is not limited in this disclosure.

In a possible implementation, the environment information may include environment-related information such as brightness, a temperature, and a road surface status (for example, a snowy road surface). A person skilled in the art may set specific content of the environment information based on an actual situation. This is not limited in this disclosure.

In a possible implementation, the information obtaining module 210 may send the obtained environment information and the status information of the first object to the processing module 220 in a time sequence. The environment information and the status information may be raw data obtained by the information obtaining module 210, that is, data that is not preprocessed, or may be data obtained after preprocessing such as noise reduction, sampling, and standardization is performed on the raw data obtained by the information obtaining module 210. This is not limited in this disclosure.

The processing module 220 may be configured to determine the first object as a potentially dangerous object based on the status information of the first object that is obtained by the information obtaining module 210, determine a potentially dangerous area of the first object, determine a to-be-projected area based on the potentially dangerous area and the environment information obtained by the information obtaining module 210, where the to-be-projected area is an area in which there is no light projection and light projection is allowed, and determine whether the to-be-projected area is within a projection range of the projection module 230.

The processing module 220 may be a general-purpose processor, a dedicated processor, or another integrated circuit, a single-chip microcomputer, a microprocessor, a chip, or the like that can perform data processing. The processor (including the general-purpose processor, the dedicated processor, and a microprocessor) may be a single-central processing unit (CPU) processor, or may be a multi-CPU processor. A hardware implementation of the processing module is not limited in this disclosure.

The projection module 230 may perform light projection in the to-be-projected area in response to a first result determined by the processing module 220, to prompt a potential danger caused by the first object, where the first result is that the to-be-projected area is within a projection range of the projection module.

In a possible implementation, the projection module 230 may perform light projection in the to-be-projected area by using a projection light source. The projection light source may be a vehicle light connected to the projection module 230, for example, a left headlight of a vehicle or a right headlight of a vehicle. The projection light source may alternatively be a light source built in the projection module 230, or may be an independent light source that is connected to the projection module 230 but is disposed outside the projection module 230. A manner of disposing the projection light source is not limited in this disclosure.

Figure 3:
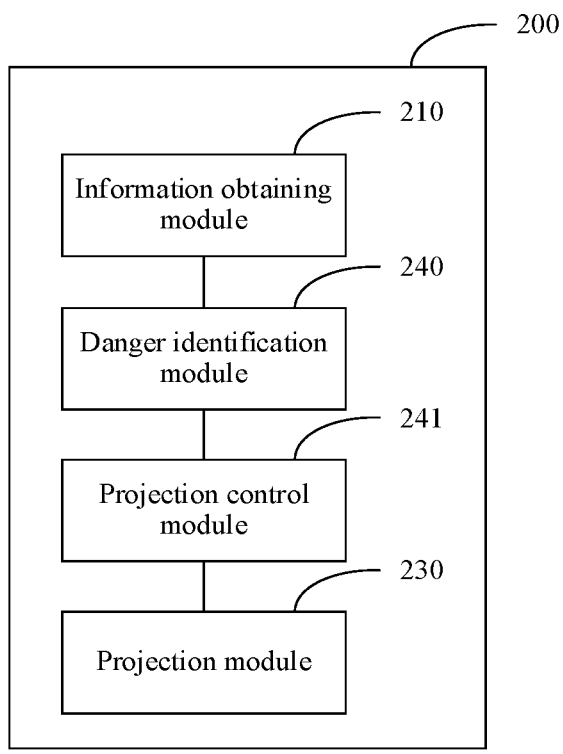
FIG. 3 is a schematic diagram of a structure of a light projection apparatus according to an embodiment of this disclosure.

FIG. 3 is a schematic diagram of a structure of a light projection apparatus according to an embodiment of this disclosure. As shown in FIG. 3, a light projection apparatus 200 includes an information obtaining module 210, a danger identification module 240, a projection control module 241, and a projection module 230. The information obtaining module 210 and the projection module 230 are similar to those in FIG. 2, and details are not described herein again.

Compared with that in FIG. 2, the danger identification module 240 and the projection control module 241 in FIG. 3 jointly complete all functions of the processing module 220 in FIG. 2. The danger identification module 240 may be configured to determine a first object as a potentially dangerous object based on status information of the first object that is obtained by the information obtaining module 210, determine a potentially dangerous area of the first object, and determine a to-be-projected area based on the potentially dangerous area and environment information obtained by the information obtaining module 210, where the to-be-projected area is an area in which there is no light projection and light projection is allowed. The projection control module 241 may be configured to determine whether the to-be-projected area is within a projection range of the projection module 230. The projection module 230 may perform light projection in the to-be-projected area in response to a first result determined by the projection control module 241, to prompt a potential danger caused by the first object, where the first result is that the to-be-projected area is within a projection range of the projection module.

It should be understood that the foregoing merely describes function division of the danger identification module 240 and the projection control module 241 as an example. A person skilled in the art may set the functions based on an actual situation. This is not limited in this disclosure. In addition, the danger identification module 240 and the projection control module 241 may be deployed on same hardware, or may be deployed on different hardware. A person skilled in the art may perform setting based on an actual situation. This is not limited in this disclosure.

Figure 4:
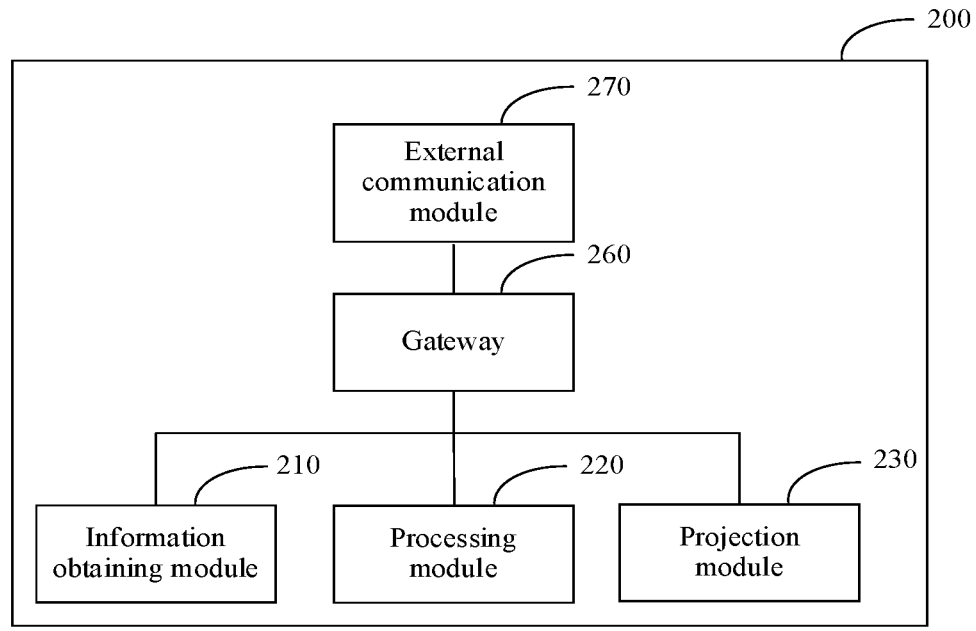
FIG. 4 is a schematic diagram of a structure of a light projection apparatus according to an embodiment of this disclosure.

FIG. 4 is a schematic diagram of a structure of a light projection apparatus according to an embodiment of this disclosure. Compared with the light projection apparatus shown in FIG. 2, the light projection apparatus shown in FIG. 4 further includes a gateway 260 and an external communication module 270. As an external interface of the light projection apparatus 200, the external communication module 270 is connected to the information obtaining module 210, the processing module 220, and the projection module 230 through the gateway 260, and can update an algorithm, a scenario library, and the like of the information obtaining module 210, the processing module 220, and the projection module 230 through technologies such as an over-the-air (OTA) technology by using the external communication module 270 and the gateway 260.

In a possible implementation, the light projection apparatus shown in FIG. 3 may also include a gateway and an external communication interface, which are similar to the gateway and the external communication interface in FIG. 4, and details are not described herein again.

Figure 5:
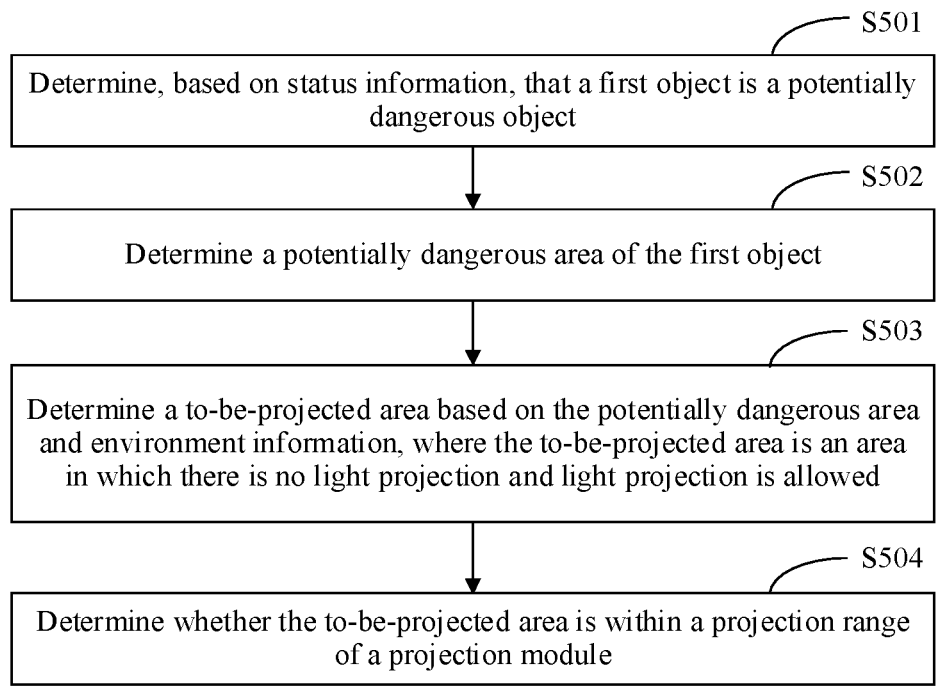
FIG. 5 is a schematic flowchart of a processing process of a processing module according to an embodiment of this disclosure.

FIG. 5 is a schematic flowchart of a processing process of a processing module according to an embodiment of this disclosure. As shown in FIG. 5, a processing process of a processing module 220 in a light projection apparatus includes step S501, step S502, step S503, and step S504.

In step S501, it is determined, based on status information, that a first object is a potentially dangerous object.

The processing module may determine whether the first object has a potential danger based on the status information (that is, at least one of location information and motion information of the first object) of the first object that is obtained by an information obtaining module, by determining whether a collision probability of the first object in preset future duration is greater than a preset collision probability threshold, whether a motion track of the first object in preset future duration overlaps, or whether a location area of the first object at one or some future moments overlaps. If the first object has a potential danger, the processing module determines the first object as a potentially dangerous object.

In a possible implementation, step S501 may include predicting a motion track of the first object in preset future duration based on the status information, and determining, based on the motion track, that the first object is the potentially dangerous object.

The processing module may determine, based on the status information of the first object, for example, the location information of the first object, a location area of the first object at a current moment through location fitting, key location determining, and the like. The location area of the first object may be represented by an area in which external space of the first object is located. The external space may be a square, a cube, a polyhedron, or the like. A specific shape of the external space is not limited in this disclosure.

After the location area of the first object at the current moment is determined, the motion track of the first object in the preset future duration may be predicted based on the location area of the first object at the current moment and a location area of the first object at, at least one historical moment, or based on the location area of the first object at the current moment and motion information (for example, information such as a moving speed and an acceleration) in the status information of the first object. It should be understood that a person skilled in the art may alternatively predict the motion track of the first object in another manner. This is not limited in this disclosure.

In a possible implementation, the preset future duration may include a plurality of future moments, and the motion track of the first object in the preset future duration may include location areas of the first object at the plurality of future moments in the preset future duration.

For example, the preset future duration is 10 seconds, a moment interval is 0.5 seconds, and the preset future duration (10 seconds) includes 20 future moments. The processing module may predict the motion track of the first object in the preset future duration (10 seconds) based on the location area of the first object at the current moment and a location area of the first object at, at least one historical moment. The motion track includes location areas of the first object at the future moments.

In a possible implementation, the motion track of the first object in the preset future duration may further include a probability (that is, a possibility) that the first object is in a corresponding location area at each future moment.

For example, for the 20 future moments in the preset future duration, a location area of the first object at a first future moment may be referred to as a first location area, and a probability that the first object is in the first location area at the first future moment is referred to as a first location probability, a location area of the first object at a second future moment is referred to as a second location area, and a probability that the first object is in the second location area at the second future moment is referred to as a second location probability, and by analogy, a location area of the first object at a twentieth future moment is referred to as a twentieth location area, and a probability that the first object is in the twentieth location area at the twentieth future moment is referred to as a twentieth location probability.

The motion track of the first object in the preset future duration (10 seconds) may include location areas (the first location area, the second location area, . . . , and the twentieth location area) of the first object at the 20 future moments and probabilities (the first location probability, the second location probability, . . . , and the twentieth location probability) of the first object in corresponding location areas at each future moment.

It should be understood that a person skilled in the art may set specific values of the preset future duration and the moment interval based on an actual situation (for example, performance indicators such as a memory size and a processing speed of the processing module). This is not limited in this disclosure.

In a possible implementation, when the first object has a plurality of potential location areas at a future moment, a probability that the first object is in each potential location area at the future moment may be separately determined, and a potential location area with a highest probability is determined as a location area of the first object at the future moment.

In a possible implementation, after the motion track of the first object in the preset future duration is determined, whether the first object has a potential danger may be determined based on the motion track by determining whether a collision probability of the first object in the preset future duration is greater than a preset collision probability threshold, or by determining whether the motion track overlaps. If the first object has a potential danger, the first object is determined as a potentially dangerous object.

For example, the first object is a plurality of objects. When determining, by determining whether the collision probability of the first object in the preset future duration is greater than the preset collision probability threshold, whether the first object has a potential danger, the processing module may determine a collision probability between the objects in the first object based on a motion track of each object in the first object in the preset future duration, where the collision probability includes at least one of a probability of collision between vehicles or a probability of collision between a vehicle and a pedestrian, and determine whether the collision probability is greater than or equal to the preset collision probability threshold, and when the collision probability is greater than or equal to the collision probability threshold, determine an object that is in the first object and that is related to the collision probability as a potentially dangerous object.

In a possible implementation, the preset future duration may include a plurality of future moments, and the motion track of the first object in the preset future duration may include location areas of the first object at the plurality of future moments in the preset future duration. The processing module may determine, based on the motion track, that the first object is a potentially dangerous object in the following manner.

The first object is a plurality of objects. For an object that is a vehicle in the first object, at any future moment in the preset future duration, the processing module may determine whether a location area of the object at the future moment overlaps a location area of another object (including a vehicle and a pedestrian) other than the object in the first object at the future moment. When the location areas overlap, the object and the other object whose location area overlaps the location area of the object may be determined as potentially dangerous objects. In other words, potentially dangerous objects may collide at a future moment, affecting traffic safety.

The first object is determined as the potentially dangerous object based on overlapping of location areas at a same future moment, which is simple, fast, and highly accurate, and can improve processing efficiency of the processing module.

In a possible implementation, for an object that is a pedestrian in the first object, that a location area of the pedestrian at a future moment overlaps a location area of a vehicle at the future moment is determined in the foregoing manner. However, for a case in which a location area of the pedestrian at a future moment overlaps a location area of another pedestrian at the future moment, considering a subjective obstacle avoidance behavior of the pedestrian, collision does not occur even if the location areas of the pedestrians at the future moment overlap, there is no potential risk.

In a possible implementation, the potentially dangerous object may include at least one group of objects, and each group of objects is traffic participants of a same potential danger. That is, the potentially dangerous object may include at least two objects.

In step S502, a potentially dangerous area of the first object is determined.

When the first object is the potentially dangerous object, the potentially dangerous area of the first object may be determined, where the potentially dangerous area includes an area in which collision may occur. Optionally, the potentially dangerous area of the first object may be determined based on a motion track of the first object. For example, for the first object whose location areas in the motion track overlap, an overlapping area may be determined as the potentially dangerous area of the first object, or an overlapping area and a peripheral area of a preset size of the overlapping area are determined as the potentially dangerous area of the first object. It should be understood that a person skilled in the art may set a manner of determining the potentially dangerous area based on an actual situation. This is not limited in this disclosure.

In a possible implementation, accuracy of the potentially dangerous area of the first object may be determined based on at least one of a size and a location of the potentially dangerous area, a probability that the first object is located in an overlapping location area, and the like. The accuracy may indicate a possibility that the first object collides in the potentially dangerous area.

In a possible implementation, when the first object is the potentially dangerous object, a potentially dangerous scenario of the first object may be further determined. The potentially dangerous scenario is a scenario in which the first object may collide, including a scenario in which a vehicle collides with another vehicle (for example, vehicle rear-end collision or vehicle scraping) or a scenario in which a vehicle collides with a pedestrian (for example, an obscured pedestrian-vehicle crash scenario in which a pedestrian suddenly appears in a vehicle driving lane).

In a possible implementation, a scenario library including a plurality of potentially dangerous scenarios may be preset, and the potentially dangerous scenario of the first object is determined in a manner such as feature comparison and feature matching. A manner of determining the potentially dangerous scenario is not limited in this disclosure.

By determining the potentially dangerous scenario of the first object, it is convenient to identify a potential danger degree of the first object and determine a projection image, thereby improving accuracy of light projection.

In step S503, a to-be-projected area is determined based on the potentially dangerous area and the environment information, where the to-be-projected area is an area in which there is no light projection and light projection is allowed.

In a possible implementation, when the to-be-projected area is determined, whether there is light projection in the potentially dangerous area of the first object at a current moment may be first determined. Optionally, an image or feature information of the potentially dangerous area at the current moment may be obtained, and whether there is light projection in the potentially dangerous area at the current moment is determined through image analysis, feature comparison, and the like.

For example, feature information of the light projection may be preset. When whether there is light projection in the potentially dangerous area at the current moment is determined, a similarity between the feature information (which may be extracted from sensing data such as an image) of the potentially dangerous area at the current moment and the preset feature information of the light projection may be calculated. When the similarity is less than or equal to a preset similarity threshold, it is considered that there is no light projection in the potentially dangerous area at the current moment. When the similarity is greater than the preset similarity threshold, it is considered that there is the light projection in the potentially dangerous area at the current moment.

In a possible implementation, the image or feature information of the potentially dangerous area at the current moment may be further input into a light projection identification network for identification, to obtain an identification result, and whether there is light projection in the potentially dangerous area at the current moment is determined based on the identification result. The light projection identification network is a trained neural network, for example, a convolutional neural network (CNN), and the like. A network type of the light projection identification network is not limited in this disclosure.

In a possible implementation, when there is no light projection in the potentially dangerous area of the first object at the current moment, whether light projection is allowed in the potentially dangerous area of the first object may be determined based on the environment information. For example, when brightness, a road surface status, and the like in the environment information meet a preset projection condition, and there is no road surface identifier in the potentially dangerous area, it may be considered that light projection is allowed in the potentially dangerous area. Otherwise, it is considered that light projection is not allowed in the potentially dangerous area. In this manner, image overlapping caused by projection on an existing road surface identifier can be avoided, thereby improving a projection effect.

The to-be-projected area is determined when there is no light projection at the current moment and light projection is allowed in the potentially dangerous area of the first object. For example, the potentially dangerous area may be determined as the to-be-projected area. Optionally, an occurrence moment of a potential danger corresponding to the potentially dangerous area may be determined, and the to-be-projected area is determined based on the occurrence moment of the potential danger. For example, when a difference between the occurrence moment of the potential danger corresponding to the potentially dangerous area and the current moment is less than a preset difference threshold, the potentially dangerous area or an area in the potentially dangerous area may be determined as the to-be-projected area.

In a possible implementation, when the to-be-projected area is determined, the motion track of the first object in the preset future duration may be further considered. In a manner similar to the foregoing manner, it may be determined that at the current moment, there is no light projection and light projection is allowed in both an area in which the motion track of the first object in the preset future duration is located and the potentially dangerous area, and then the to-be-projected area is determined based on the motion track of the first object in the preset future duration and the potentially dangerous area.

For example, an occurrence moment of a potential danger corresponding to the potentially dangerous area may be determined, and when a difference between the occurrence moment of the potential danger and the current moment is greater than or equal to a preset difference threshold, a central area in a location area in which the first object is located at a future moment (for example, a second future moment) in the motion track of the first object may be determined as the to-be-projected area. The central area is an area including a central point of the location area. A size of the central area may be set based on an actual situation. This is not limited in this disclosure.

It should be understood that, when the to-be-projected area is determined, another factor such as a potentially dangerous scenario may be further considered. This is not limited in this disclosure. The to-be-projected area may be alternatively located in another location. For example, an area of a preset size in front of a driver in a location area in which the first object is located at a future moment may be determined as the to-be-projected area, so that the driver can view projection information. A person skilled in the art may set a specific location of the to-be-projected area based on an actual situation. This is not limited in this disclosure.

In a possible implementation, when the to-be-projected area is determined, a possible projection area may be first determined based on the potentially dangerous area and the environment information, and in a manner similar to the foregoing manner, whether there is light projection in the possible projection area and whether light projection is allowed in the possible projection area is determined, and when there is no light projection and light projection is allowed in the possible projection area, the possible projection area is determined as the to-be-projected area.

In step S504, whether the to-be-projected area is within a projection range of the projection module is determined.

Whether the to-be-projected area is within the projection range of the projection module may be determined based on the projection range of the projection module through area coverage, location comparison, and the like.

When the to-be-projected area is within the projection range of the projection module, a first result may be sent to the projection module, so that the projection module performs light projection in the to-be-projected area in response to the first result, to notify the user of the potential danger caused by the first object.

In a possible implementation, when the to-be-projected area is within the projection range of the projection module, the processing module may be further configured to generate a projection image and light control information. The projection image is determined based on the environment information and the potential danger caused by the first object, the light control information is determined based on the environment information, the projection image, and the to-be-projected area, and the light control information includes at least one of an angle, brightness, or a color of a light.

For example, when the projection image is generated, external brightness may be determined based on the environment information, and the projection image is determined based on the external brightness and the potential danger caused by the first object, so that the projection image can accurately describe the potential danger and is easy to identify. For example, a contrast between the projection image and the external brightness is large.

In a possible implementation, when the projection image is generated, the potentially dangerous scenario of the first subject may be further considered. A plurality of objects related to the potentially dangerous scenario of the first object may be determined, and a projection image is separately generated for each object. The projection images of different objects may be different. For example, the potentially dangerous scenario of the first object is a scenario in which a vehicle may collide with a pedestrian. In this scenario, a projection image generated for the pedestrian is "A vehicle is in front", and a projection image generated for the vehicle is "A pedestrian is in front". The projection image may be set based on an actual situation. This is not limited in this disclosure.

In a possible implementation, when the projection image has a direction, a movement direction of a second object may be further determined based on a motion track of the second object corresponding to the projection image, and a direction of a projection image of the second object is determined based on the movement direction of the second object, so that a viewing direction of the projection image is consistent with the movement direction of the second object. The second object is a projected object of the projection image. For example, a second object corresponding to a projection image generated for a vehicle B is the vehicle B.

In a possible implementation, the light control information may be determined based on the environment information, the projection image, and the to-be-projected area, where the light control information includes at least one of an angle, brightness, and a color of a light. For example, a relative location between the to-be-projected area and the projection module may be determined, and the angle of the light during projection is determined based on the relative location and the projection image, and the brightness and color of the light during projection may be determined based on the environment information (for example, a road surface status and brightness) and the projection image within a projection capability range (for example, a color and brightness that can be projected) of the projection module. For example, when the road surface status is a snowy road surface, the color of the light during projection may be determined as red. In this manner, the light control information can be determined with reference to the surrounding environment information, thereby improving a projection effect of the light projection apparatus on a complex road surface.

In a possible implementation, after generating the projection image and the light control information, the processing module may send the projection image and the light control information to the projection module, and the projection module may perform light projection in the to-be-projected area based on the projection image and the light control information.

The projection image is determined based on the environment information and the potential danger caused by the first object, and the light control information is determined based on the environment information, the projection image, and an image area, so that the projection image and the light control information can be combined with the potential danger caused by the first object and the external environment information, thereby improving readability of danger warning, and improving a projection effect.

In a possible implementation, when the first object is a plurality of objects, the processing module is further configured to determine a projection sequence of the plurality of objects based on a potential danger degree of each of the plurality of objects.

When the projection sequence is determined, the potential danger degree of each of the plurality of objects may be first determined based on at least one of a potentially dangerous area or a potentially dangerous scenario. For example, for any object, an occurrence moment of a potential danger corresponding to a potentially dangerous area of the object may be determined, and a potential danger degree of the object is determined based on a difference between the occurrence moment of the potential danger and a current moment, where a smaller difference indicates a higher corresponding potential danger degree. Alternatively, different weights may be preset for different potentially dangerous scenarios. For any object, a weight corresponding to a potentially dangerous scenario of the object may be determined, and a potential danger degree of the object is determined based on the weight, where a larger weight indicates a higher corresponding potential danger degree. Alternatively, for any object, a difference between an occurrence moment of a potential danger corresponding to a potentially dangerous area of the object and a current moment may be adjusted based on a weight corresponding to a potentially dangerous scenario of the object, to obtain an adjusted difference, and a potential danger degree of the object is determined based on the adjusted difference.

In a possible implementation, when the potential danger degree of each of the plurality of objects is determined, for any object, accuracy of a potentially dangerous area of the object may be further used as a weight, to adjust a difference between an occurrence moment of a potential danger corresponding to the potentially dangerous area of the object and a current moment, to obtain an adjusted difference, and determine a potential danger degree of the object based on the adjusted difference. It should be understood that a person skilled in the art may set a manner of determining the potential danger degree based on an actual situation. This is not limited in this disclosure.

After the potential danger degrees of the plurality of objects are determined, the projection sequence of the plurality of objects may be determined based on the potential danger degrees. For example, the plurality of objects may be sorted in descending order of potential danger degrees, to obtain the projection sequence of the plurality of objects. Optionally, when the projection sequence of the plurality of objects is determined, whether the projection module can simultaneously project the plurality of objects may be further considered. When the projection module can simultaneously project the plurality of objects, for example, the projection module includes three independent projection light sources, and can simultaneously project three objects, three projection queues may be determined, that is, each projection light source corresponds to one projection queue, and objects in each projection queue are arranged in descending order of potential danger degrees. Alternatively, one main projection queue may be determined, and objects in the main projection queue are also arranged in descending order of potential danger degrees. The projection module distributes, according to the projection sequence, the objects in the main projection queue to the three projection light sources for projection, for example, light projection is simultaneously performed on the first to third objects in the main projection queue.

In a possible implementation, when the plurality of objects is simultaneously projected, potentially dangerous scenarios of the plurality of objects that are simultaneously projected may be different. For example, the projection module can simultaneously project three objects. A potentially dangerous scenario of a first object is a possible vehicle rear-end collision scenario, a potentially dangerous scenario of a second object is a possible vehicle scraping scenario, and a potentially dangerous scenario of a third object is a possible obscured pedestrian-vehicle crash scenario. Projecting a plurality of objects simultaneously can improve projection efficiency, thereby improving traffic safety.

In a possible implementation, after the projection sequence of the plurality of objects is determined, the processing module sends the projection sequence to the projection module, so that the projection module sequentially performs, according to the projection sequence, light projection in a one-to-one correspondence with the plurality of objects.

By determining the projection sequence of the plurality of objects, an object with a high potential danger degree can be preferentially projected, thereby improving a warning effect, effectively reducing an occurrence rate of a potential danger, and improving traffic safety. According to this embodiment of this disclosure, the light projection apparatus includes the information obtaining module, the processing module, and the projection module. The information obtaining module obtains the environment information and the status information of the first object. The processing module may determine, based on the status information, that the first object is the potentially dangerous object, determine the potentially dangerous area of the first object, determine, based on the potentially dangerous area and the environment information, the to-be-projected area in which there is no light projection and light projection is allowed, and determine whether the to-be-projected area is within the projection range of the projection module. In response to the first result of the processing module (the to-be-projected area is within the projection range of the projection module), the projection module performs light projection in the to-be-projected area, to prompt the potential danger caused by the first object. In this way, the light projection apparatus can use a sensing and projection function of the light projection apparatus, when sensing that another traffic participant has a potential danger, prompt or warn the potential danger, and during projection, determine an area in which there is no light projection and light projection is allowed as the to-be-projected area, to avoid overlapping projection, improve projection and warning effects, and form a danger information sharing mechanism, thereby effectively improving traffic safety.

Figure 6:
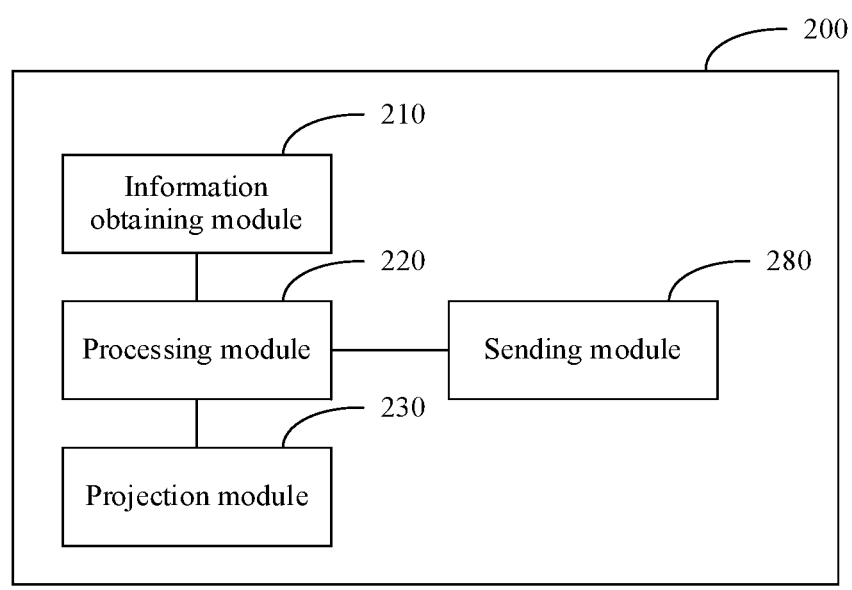
FIG. 6 is a schematic diagram of a structure of a light projection apparatus according to an embodiment of this disclosure.

FIG. 6 is a schematic diagram of a structure of a light projection apparatus 200 according to an embodiment of this disclosure. As shown in FIG. 6, a light projection apparatus 200 includes an information obtaining module 210, a processing module 220, a projection module 230, and a sending module 280. The light projection apparatus 200 includes the information obtaining module 210, the processing module 220, and the projection module 230, which are similar to the foregoing. This is not described herein again.

The sending module 280 may send information indicating that a first object is a potentially dangerous object and a to-be-projected area to another apparatus in response to a second result determined by the processing module 220, where the second result is that the to-be-projected area is not within a projection range of the projection module 230.

The other apparatus may be, for example, another light projection apparatus whose projection range can cover the to-be-projected area, or may be a forwarding apparatus (such as an RSU) that does not have a projection function, or may be another light projection apparatus whose projection range cannot cover the to-be-projected area.

When the to-be-projected area is not within the projection range of the projection module 230, that is, when the to-be-projected area exceeds the projection range of the projection module 230, the processing module 220 may send the information indicating that the first object is the potentially dangerous object and the to-be-projected area to the sending module 280. After receiving the information indicating that the first object is the potentially dangerous object and the to-be-projected area, the sending module 280 may use a wireless communication manner such as V2X communication, BLUETOOTH communication, or cellular communication to send the information indicating that the first object is the potentially dangerous object and the to-be-projected area to the other apparatus, so that the other apparatus having a projection function performs light projection on a potential danger caused by the first object, or the other apparatus that does not have a projection function performs relay forwarding on the information indicating that the first object is the potentially dangerous object and the to-be-projected area.

The information indicating that the first object is the potentially dangerous object may include, for example, at least one of information such as a current location, a potentially dangerous area, a potentially dangerous scenario, a potential danger degree, and a motion track of the first object. It should be understood that a person skilled in the art may set specific content of the information indicating that the first object is the potentially dangerous object based on an actual situation. This is not limited in this disclosure.

According to this embodiment of this disclosure, when the to-be-projected area is not within the projection range of the projection module, the light projection apparatus can send, by using the sending module, the information indicating that the first object is the potentially dangerous object and the to-be-projected area to another apparatus, so that the other apparatus that has a projection function performs light projection on the potential danger caused by the first object, or the other apparatus that does not have a projection function forwards the information indicating that the first object is the potentially dangerous object and the to-be-projected area. In this way, the other apparatus can perform light projection or relay forwarding on a potential danger that is in the to-be-projected area but is not within the projection range of the light projection apparatus, so that projection efficiency can be improved, and danger information can be shared, thereby improving traffic safety.

Figure 7:
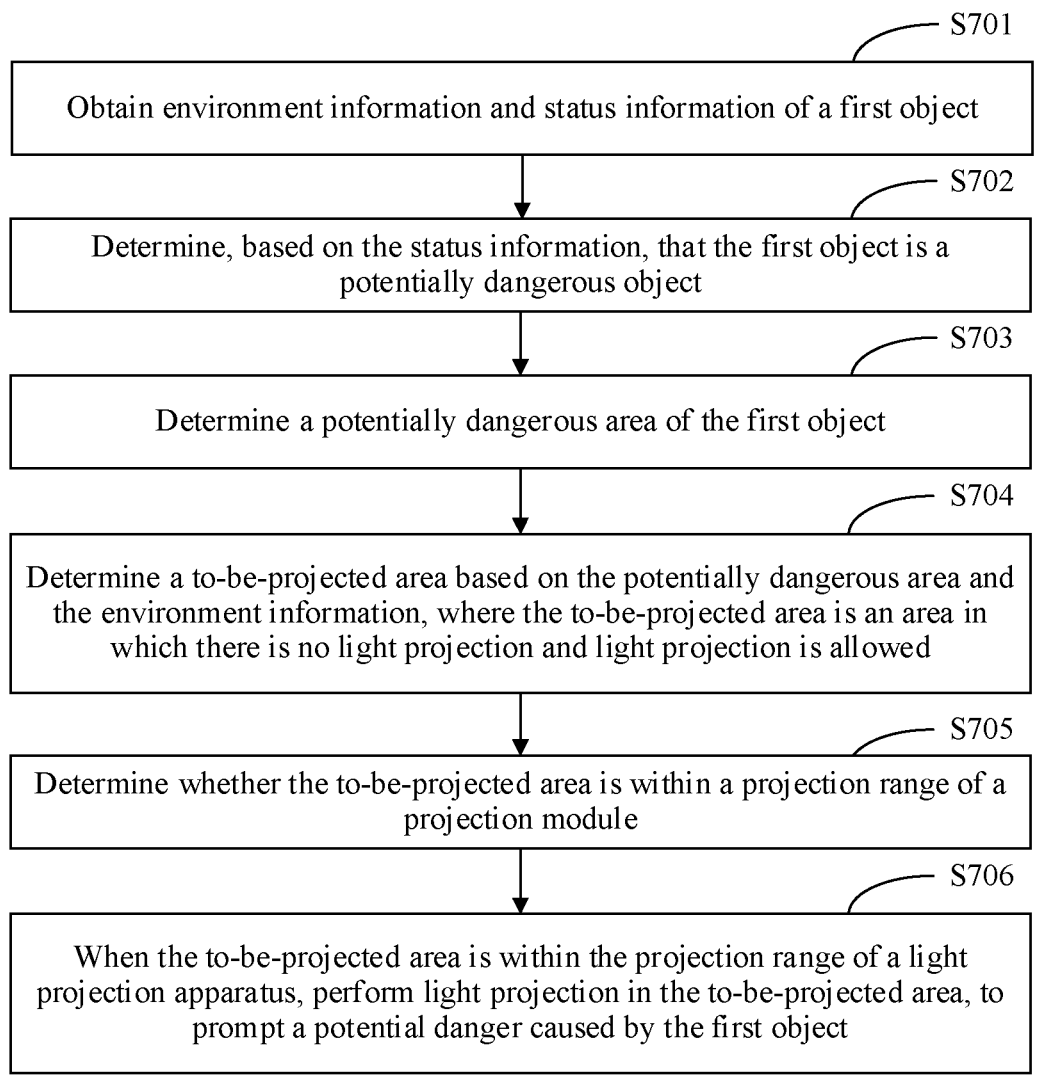
FIG. 7 is a schematic flowchart of a light projection method according to an embodiment of this disclosure.

FIG. 7 is a schematic flowchart of a light projection method according to an embodiment of this disclosure. As shown in FIG. 7, the light projection method is applied to a light projection apparatus, and the method includes the following steps.

Step S701: Obtain environment information and status information of a first object, where the first object includes at least one of a vehicle or a pedestrian, and the status information of the first object includes at least one of location information or motion information of the first object.

Step S702: Determine, based on the status information, that the first object is a potentially dangerous object.

Step S703: Determine a potentially dangerous area of the first object.

Step S704: Determine a to-be-projected area based on the potentially dangerous area and the environment information, where the to-be-projected area is an area in which there is no light projection and light projection is allowed.

Step S705: Determine whether the to-be-projected area is within a projection range of the light projection apparatus.

Step S706: When the to-be-projected area is within the projection range of the light projection apparatus, perform light projection in the to-be-projected area, to prompt a potential danger caused by the first object.

In a possible implementation, the method further includes, when the to-be-projected area is not within the projection range of the light projection apparatus, sending information indicating that the first object is the potentially dangerous object and the to-be-projected area to another apparatus.

In a possible implementation, the first object is a plurality of objects, the method further includes determining a projection sequence of the plurality of objects based on a potential danger degree of each of the plurality of objects, and performing light projection in the to-be-projected area includes performing, according to the projection sequence, a plurality of pieces of light projection that are in a one-to-one correspondence with the plurality of objects.

In a possible implementation, the method further includes generating a projection image and light control information, and performing light projection in the to-be-projected area includes performing light projection in the to-be-projected area based on the projection image and the light control information, where the projection image is determined based on the environment information and the potential danger caused by the first object, the light control information is determined based on the environment information, the projection image, and the to-be-projected area, and the light control information includes at least one of an angle, brightness, or a color of a light.

In a possible implementation, the method further includes determining a potentially dangerous scenario of the first object.

In a possible implementation, the method further includes determining a potential danger degree of the first object based on at least one of the potentially dangerous area or the potentially dangerous scenario.

In a possible implementation, determining, based on the status information, that the first object is a potentially dangerous object includes predicting, based on the status information, a motion track of the first object in preset future duration, and determining, based on the motion track, that the first object is the potentially dangerous object.

In a possible implementation, the preset future duration includes a plurality of future moments, the motion track of the first object in the preset future duration includes location areas of the first object at the plurality of future moments, and determining, based on the motion track, that the first object is the potentially dangerous object includes, for an object that is a vehicle in the first object, determining, at any future moment in the preset future duration, whether a location area of the object at the future moment overlaps a location area of another object other than the object in the first object at the future moment, and when the location areas overlap, determining that the object and the other object whose location area overlaps the location area of the object are potentially dangerous objects.

In a possible implementation, the light projection apparatus is applied to a vehicle or road side infrastructure.

An embodiment of this disclosure provides a light projection apparatus, including a processor and a memory configured to store instructions that can be executed by the processor, where the processor is configured to implement the foregoing method when executing the instructions.

An embodiment of this disclosure provides a computer-readable storage medium. The computer-readable storage medium stores computer program instructions. When the computer program instructions are executed by a processor, the method is implemented.

An embodiment of this disclosure provides a computer program product, including computer-readable code or a non-volatile computer-readable storage medium carrying computer-readable code. When the computer-readable code is run in a processor of an electronic device, the processor in the electronic device performs the foregoing method.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include a portable computer disk, a hard disk, a random-access memory (RAM), a read-only memory (ROM), an erasable programmable ROM (EPROM or flash memory), a static RAM (SRAM), a portable compact disc (CD) ROM (CD-ROM), a DIGITAL VERSATILE DISC (DVD), a memory stick, a floppy disc, a mechanical coding device, for example, a punching card or a groove protrusion structure that stores instructions, and any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this disclosure may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as SMALL-TALK and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, for example, a programmable logic circuit, a field-programmable gate array (FPGA), or a programmable logic array (PLA), is customized by using status information of computer-readable program instructions. The electronic circuit may execute the computer-readable program instructions, to implement various aspects of this disclosure.

The various aspects of this disclosure are described herein with reference to the flowcharts and/or the block diagrams of the method, the apparatus (system), and the computer program product according to embodiments of this disclosure. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the other programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the other programmable data processing apparatus, or the other device to produce a computer-implemented process. Therefore, the instructions executed on the computer, the other programmable data processing apparatus, or the other device implements functions/actions specified in one or more blocks in the flowcharts and/or the block diagrams.

The flowcharts and the block diagrams in the appended drawings illustrate system architectures, functions, and operations of possible implementations of apparatuses, systems, methods, and computer program products according to a plurality of embodiments of this disclosure. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an application-specific integrated circuit (ASIC)) that performs a corresponding function or action, or may be implemented by a combination of hardware and software, for example, firmware.

Although the present application is described with reference to embodiments, in a process of implementing the present application that claims protection, a person skilled in the art may understand and implement another variation of the disclosed embodiments by viewing the accompanying drawings, the disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Embodiments of this disclosure are described above. The foregoing descriptions are examples, are not exhaustive, and are not limited to the disclosed embodiments. Many modifications and changes are clear to a person of ordinary skill in the art without departing from the scope of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. An apparatus comprising:
at least one memory configured to store instructions; and
at least one processor coupled to the at least one memory and configured to execute the instructions to cause the apparatus to:
obtain environment information and status information of a first object, wherein the first object comprises at least one of a vehicle or a pedestrian, and wherein the status information comprises at least one of location information of the first object or motion information of the first object;
determine, based on the status information, that the first object is a potentially dangerous object;

determine a potentially dangerous area of the potentially dangerous object;

determine, based on the potentially dangerous area and the environment information, a to-be-projected area, wherein the to-be-projected area is an area in which there is no light projection and the light projection is allowed;

determine whether the to-be-projected area is within a projection range of the apparatus;

perform, when the to-be-projected area is within the projection range, the light projection in the to-be-projected area to warn a potential danger from the first object; and send, to another apparatus when the to-be-projected area is not within the projection range, information indicating that the first object is the potentially dangerous object and indicating the to-be-projected area, wherein the other apparatus performs the light projection on the potential danger caused by the first object when the other apparatus has a projection function, and wherein the other apparatus performs a relay forwarding of the information indicating that the first object is the potentially dangerous object and indicating the to-be-projected area when the other apparatus has no projection function.

2. The apparatus of claim 1, wherein the first object comprises a plurality of objects, and wherein the at least one processor is further configured to execute the instructions to cause the apparatus to:

determine, based on a potential danger degree of each of the objects, a projection sequence of the objects; and perform, according to the projection sequence, a plurality of pieces of the light projection that are in a one-to-one correspondence with the objects.

3. The apparatus according-teof claim 1, wherein the at least one processor is further configured to execute the instructions to cause the apparatus to:

generate a projection image and light control information, wherein the projection image is based on the environment information and the potential danger, and wherein the light control information is based on the environment information, the projection image, and the to-be-projected area and comprises at least one of an angle of a light a brightness of the light, or a color of the light; and further perform, based on the projection image and the light control information, the light projection in the to-be-projected area.

4. The apparatus of claim 1, wherein the at least one processor is further configured to execute the instructions to cause the apparatus to determine a potentially dangerous scenario of the first object.

5. The apparatus of claim 1, wherein the apparatus is implemented in the vehicle or a road side infrastructure.

6. The apparatus of claim 4, wherein the at least one processor is further configured to execute the instructions to cause the apparatus to determine, based on the potentially dangerous area or the potentially dangerous scenario, a potential danger degree of the first object.

7. The apparatus of claim 1, wherein the at least one processor is further configured to execute the instructions to cause the apparatus to:

predict, based on the status information, a motion track of the first object in a preset future duration; and determine, based on the motion track, that the first object is the potentially dangerous object.

8. The apparatus of claim 7, wherein the preset future duration comprises a plurality of future moments, wherein the motion track comprises location areas of the first object at the future moments, and wherein the at least one processor is further configured to execute the instructions to cause the apparatus to:

determine, for a second object that is the vehicle in the first object and at a future moment in the preset future duration, whether a first location area of the second object at the future moment overlaps a second location area of a third object; and determine, when the first location area and the second location area overlap, that the second object and the third object are potentially dangerous objects.

9. A method comprising:

obtaining environment information and status information of a first object, wherein the first object comprises at least one of a vehicle or a pedestrian, and wherein the status information comprises at least one of location information of the first or motion information of the first object;

determining, based on the status information, that the first object is a potentially dangerous object;

determining a potentially dangerous area of the first potentially dangerous object; determining a to-be-projected area based on the potentially dangerous area and the environment information, wherein the to-be-projected area is an area in which there is no light projection and the light projection is allowed;

determining whether the to-be-projected area is within a projection range of a light projection apparatus;

performing, when the to-be-projected area is within the projection range, the light projection in the to-be-projected area to warn a potential danger from the first object; and sending, to another apparatus when the to-be-projected area is not within the projection range, information indicating that the first object is the potentially dangerous object and indicating the to-be-projected area, wherein the other apparatus performs the light projection on the potential danger caused by the first object when the other apparatus has a projection function, and wherein the other apparatus performs a relay forwarding of the information indicating the first object is the potentially dangerous object and indicating the to-be-projected area when the other apparatus has no projection function.

10. The method of claim 9, wherein the first object comprises a plurality of objects, and wherein the method further comprises:

determining, based on a potential danger degree of each of the objects, a projection sequence of the objects; and performing, according to the projection sequence, a plurality of pieces of the light projection that are in a one-to-one correspondence with the objects.

11. The method of claim 9, further comprising:

generating a projection image and light control information, wherein projection image is based on the environment information and the potential danger and wherein the light control information is based on the environment information, the projection image, and the to-be-projected area and comprises at least one of an angle of a light, a brightness of the light, or a color of the light; and further performing. based on the projection image and the light control information, the light projection in the to-be-projected area.

12. The method of claim 9, further comprising determining a potentially dangerous scenario of the first object.

13. The method of claim 9, wherein the light projection apparatus is applied to the vehicle or a road side infrastructure.

14. The method of claim 12, further comprising determining, based on the potentially dangerous area or the potentially dangerous scenario, a potential danger degree of the first object.

15. The method of claim 9, wherein determining that the first object is the potentially dangerous object comprises:
    predicting, based on the status information, a motion track of the first object in a preset future duration; and
    further determining, based on the motion track, that the first object is the potentially dangerous object.

16. The method of claim 15, wherein the preset future duration comprises a plurality of future moments, wherein the motion track comprises location areas of the first object at the future moments, and wherein the method further comprises:
    determining, for a second object that is the vehicle in the first object and a future moment in the preset future duration, whether a first location area of the second object at the future moment overlaps a second location area of a third object; and
    determine, when the first location and the second location area overlap, that the second object and the third object are potentially dangerous objects.

17. A non-transitory computer program product comprising computer- executable instructions that are stored on a non-transitory computer-readable medium and that, when executed by at least one processor, cause an apparatus to:
    obtain environment information and status information of a first object, wherein the first object comprises at least one of a vehicle or a pedestrian, and wherein the status information comprises at least one of location information of the first object or motion information of the first object;
    determine, based on the status information, that the first object is a potentially dangerous object;
    determine a potentially dangerous area of the potentially dangerous object; determine, based on the potentially dangerous area and the environment information, a to-be-projected area, wherein the to-be-projected area is an area in which there is no light projection and the light projection is allowed; determine whether the to-be-projected area is within a projection range of the apparatus;
    perform, when the to-be-projected area is within the projection range, the light projection in the to-be-projected area to warn a potential danger from the first object; and
    send, when the to-be-projected area is not within the projection range, information indicating that the first object is the potentially dangerous object and indicating the to-be-projected area to another apparatus,
    wherein the other apparatus performs the light projection on the potential danger caused by the first object, and
    wherein the other apparatus performs a relay forwarding of the information indicating that the first object is the potentially dangerous object and indicating the to-be-projected area when the other apparatus has no projection function.

* * * * *

UNITED STATES PATENT AND TRADEMARK OFFICE
CERTIFICATE OF CORRECTION

PATENT NO. : 12,307,899 B2
APPLICATION NO. : 18/468295
DATED : May 20, 2025
INVENTOR(S) : Haiying Jiang, Yuan Xia and Nan Liu Page 1 of 1

It is certified that error appears in the above-identified patent and that said Letters Patent is hereby corrected as shown below:

In the Claims

Claim 3, Column 27, Line 36: "The apparatus according-teof claim 1, wherein the at" should read "The apparatus of claim 1, wherein the at"

Claim 11, Column 28, Line 58: "tion, wherein projection image is based on the envi-" should read "tion, wherein the projection image is based on the envi-"

Claim 16, Column 29, Line 26: "determine, when the first location and the second location" should read "determine, when the first location area and the second location"

Signed and Sealed this
Twenty-fourth Day of June, 2025

Coke Morgan Stewart
*Acting Director of the United States Patent and Trademark Office*